United States Patent

Scheffer et al.

(10) Patent No.: US 9,489,965 B2
(45) Date of Patent: Nov. 8, 2016

(54) METHOD AND APPARATUS FOR ACOUSTIC SIGNAL CHARACTERIZATION

(71) Applicant: SRI International, Menlo Park, CA (US)

(72) Inventors: Nicolas Scheffer, San Francisco, CA (US); Luciana Ferrer, Buenos Aires (AR)

(73) Assignee: SRI International, Menlo Park, CA (US)

( * ) Notice: Subject to any disclaimer, the term of this patent is extended or adjusted under 35 U.S.C. 154(b) by 272 days.

(21) Appl. No.: 13/838,512

(22) Filed: Mar. 15, 2013

(65) Prior Publication Data

US 2014/0278412 A1   Sep. 18, 2014

(51) Int. Cl.
- G10L 15/02 (2006.01)
- G10L 25/27 (2013.01)
- G10L 25/03 (2013.01)
- G10L 17/20 (2013.01)

(52) U.S. Cl.
CPC ............ G10L 25/27 (2013.01); G10L 25/03 (2013.01); G10L 17/20 (2013.01)

(58) Field of Classification Search
CPC ........ G10L 15/02; G10L 15/08; G10L 15/14
USPC ................................................. 704/236, 255
See application file for complete search history.

(56) References Cited

U.S. PATENT DOCUMENTS

| | | | |
|---|---|---|---|
| 5,930,749 A * | 7/1999 | Maes ................. | G10L 21/0272 704/219 |
| 5,970,446 A * | 10/1999 | Goldberg ................ | G10L 15/20 704/233 |
| 6,195,634 B1 * | 2/2001 | Dudemaine ........... | G10L 15/063 704/231 |
| 6,466,908 B1 * | 10/2002 | Baggenstoss ................. | 704/256 |
| 7,062,433 B2 * | 6/2006 | Gong .................... | G10L 15/142 704/226 |
| 8,140,325 B2 * | 3/2012 | Kanevsky ............... | G10L 15/20 704/226 |
| 8,271,278 B2 * | 9/2012 | Chaudhari et al. ........... | 704/230 |
| 8,639,502 B1 * | 1/2014 | Boucheron et al. .......... | 704/226 |
| 2001/0044719 A1 * | 11/2001 | Casey ........................... | 704/245 |
| 2004/0148154 A1 * | 7/2004 | Acero et al. ..................... | 704/1 |

(Continued)

OTHER PUBLICATIONS

L. Ferrer, H. Bratt, L. Burget, H. Cernocky, O. Glembek, M. Graciarena, A. Lawson, Y. Lei, P. Matejka, O. Plochot, and N. Scheffer, "Promoting Robustness for Speaker Modeling in the Community: The PRISM Evaluation Set," *Proceedings of the SRE11 Analysis Workshop*, Atlanta, Dec. 2011.

(Continued)

*Primary Examiner* — Michael N Opsasnick
(74) *Attorney, Agent, or Firm* — Barnes & Thornburg LLP

(57) ABSTRACT

Characterizing an acoustic signal includes extracting a vector from the acoustic signal, where the vector contains information about the nuisance characteristics present in the acoustic signal, and computing a set of likelihoods of the vector for a plurality of classes that model a plurality of nuisance characteristics. Training a system to characterize an acoustic signal includes obtaining training data, the training data comprising a plurality of acoustic signals, where each of the plurality of acoustic signals is associated with one of a plurality of classes that indicates a presence of a specific type of nuisance characteristic, transforming each of the plurality of acoustic signals into a vector that summarizes information about the acoustic characteristics of the signal, to produce a plurality of vectors, and labeling each of the plurality of vectors with one of the plurality of classes.

21 Claims, 4 Drawing Sheets

(56) References Cited

U.S. PATENT DOCUMENTS

| | | | |
|---|---|---|---|
| 2006/0074664 A1* | 4/2006 | Lam et al. | 704/255 |
| 2006/0115145 A1* | 6/2006 | Bishop et al. | 382/155 |
| 2007/0055508 A1* | 3/2007 | Zhao et al. | 704/226 |
| 2007/0276666 A1* | 11/2007 | Rosec et al. | 704/260 |
| 2008/0010065 A1* | 1/2008 | Bratt et al. | 704/246 |
| 2008/0147404 A1* | 6/2008 | Liu et al. | 704/256.2 |
| 2009/0048841 A1* | 2/2009 | Pollet et al. | 704/260 |
| 2009/0228272 A1* | 9/2009 | Herbig et al. | 704/233 |
| 2010/0198598 A1* | 8/2010 | Herbig et al. | 704/240 |
| 2011/0040561 A1* | 2/2011 | Vair et al. | 704/240 |
| 2011/0208521 A1* | 8/2011 | McClain | 704/233 |
| 2014/0214421 A1* | 7/2014 | Shriberg et al. | 704/243 |

OTHER PUBLICATIONS

E. Shriberg, M. Graciarena, H. Bratt, A. Kathol, S. Kajarekar, H. Jameel, C. Richey, and F. Goodman, "Effects of Vocal Effort and Speaking Style on Text-Independent Speaker Verification," *Proceedings of the Interspeech Conference*, Brisbane, Sep. 2008.

M. Graciarena, S. Kajarekar, A. Stolcke, and E. Shriberg, "Noise Robust Speaker Identification for Spontaneous Arabic Speech," *Proceedings of the IEEE Conference on Acoustics, Speech, and Signal Processing (ICASSP)*, Honolulu, Apr. 2007.

M. Graciarena, H. Franco, G. Myers, and V. Abrash, "Robust Feature Compensation, in Nonstationary and Multiple Noise Environments," *Proceedings of the 9th European Conference on Speech Communication and Technology (Eurospeech 05)*, Lisbon, Sep. 2005.

B. E. D. Kingsbury and N. Morgan, "Recognizing Reverberant Speech with RASTA-PLP," *Proceedings of the IEEE Conference on Acoustics, Speech, and Signal Processing (ICASSP)*, Munich, Apr. 1997.

L. Ferrer, K. Sonmez, and S. Kajarekar, "Class-Dependent Score Combination for Speaker Recognition," *Proceedings of the 9th European Conference on Speech Communication and Technology (Eurospeech 05)*, Lisbon, Sep. 2005.

L. Ferrer, M. Graciarena, A. Zymnis, and E. Shriberg, "System Combination Using Auxiliary Information for Speaker Verification," *Proceedings of the IEEE Conference on Acoustics, Speech, and Signal Processing (ICASSP)*,Las Vegas, Apr. 2008.

S. Sagayama, K. Shinoda, M. Nakai, H. Shimodaira, "Analytic Methods for Acoustic Model Adaptation: A Review," *Proceedings of the ISCA Workshop on Adaptation Methods*, Sophia Antipolis, France, Aug. 2011, pp. 67-76.

C. Kim and R. M. Stern, "Robust Signal-to-Noise Ratio Estimation Based on Waveform Amplitude Distribution Analysis," *Proceedings of the Interspeech Conference*, Brisbane, Sep. 2008.

R. Ratnam, D. L. Jones, B. C. Wheeler, Jr. W. D. O'Brien, C. R. Lansing, and A. S. Feng, "Blind Estimation of Reverberation Time," *The Journal of the Acoustical Society of America*, vol. 114, No. 5, pp. 2877-2892, 2003.

D. Gonzalez Martinez, O. Plchot, L. Burget, O. Glembek, and P. Matejka, "Language recognition in Ivectors Space," *Proceedings of the Interspeech Conference*, Florence, Italy, Aug. 2011.

N. Dehak, P. J. Kenny, R. Dehak, P. Dumoucel, and P. Ouellet, "Front-End, Factor Analysis for Speaker Verification," *IEEE Transactions on Audio, Speech, and Language Processing*, vol. 19, No. 4, pp. 788-798, May 2011.

P. Matejka, O. Glembek, F. Castaldo, J. Alam, O. Plchot, P. Kenny, L. Burget, J. Cernocky, Full-Covariance UBM and Heavy-Tailed PLDA in i-Vector Speaker Verification, *Proceedings of the Interspeech Conference*, Florence, Italy, Aug. 2011.

G. Hirsch, "Fant," http://dnt.kr.hs-niederrhein.de/download.html, Mar. 15, 2005, pp. 1-4 Niederhiem University of Applied Sciences.

E. de Villiers and N. Brummer, "Bosaris Toolkit,", Dec. 2011, pp. 1-24.

N. Brummer, L. Burget, P. Kenny, P. Matejka, E. de Villiers, M. Karafiat, M. Kockmann, O. Glembek, O. Plchot, D. Baum, M. Senoussauoi, "ABC System Description for NIST SRE 2010," *Proceedings of NIST 2010 Speaker Recognition Evaluation*. 2010, pp. 1-20, National Institute of Standards and Technology.

D. Garcia-Romero and C. Y. Espy-Wilson, "Analysis of i-Vector Length Normalization in Speaker Recognition Systems," *Proceedings of the Interspeech Conference*, Florence, Italy, Aug. 2011.

S. J. D. Prince, "Probabilistic, Linear Discriminant Analysis for Inferences about Identity," *Proceedings of the International Conference on Computer Vision*, 2007.

"NIST SRE10 Evaluation Plan," http://www.itl.nist.gov/iad/mig/tests/sre/2010/NIST_SRE10_evalplan.r6.pdf, Apr. 21, 2010, pp. 1-20.

\* cited by examiner

METHOD AND APPARATUS FOR ACOUSTIC SIGNAL CHARACTERIZATION

REFERENCE TO GOVERNMENT FUNDING

This invention was made with Government support under contract no. W911NF-10-C-0026, awarded by the U.S. Army Research, Development & Engineering Command. The Government has certain rights in this invention.

FIELD OF THE INVENTION

The present invention relates generally to speech processing, and relates more particularly to the detection of acoustic signal characteristics.

BACKGROUND OF THE DISCLOSURE

Systems designed to solve speech processing tasks (e.g., speech or speaker recognition, language identification, emotion detection) are known to be affected by the recording conditions of the acoustic signal being processed. These conditions include nuisance characteristics that can interfere with the system's ability to process the acoustic signal in the desired manner, such as channel effects, background noise, reverberation, signal-to-noise ratio, language, speaker mood, and other characteristics that are unrelated to the characteristics one may want to detect. For instance, language variations are a nuisance when attempting to detect speaker identity, while speaker variations are a nuisance when attempting to detect language.

Knowledge of the nuisance characteristics present in the signal can be used to improve the performance of the system, since this knowledge can be used to predict the optimal parameters of the system under the detected nuisance characteristics. In some cases, the nature of the nuisance characteristics is known a priori, but in most practical cases, it is not. Conventional solutions used to automatically detect the characteristics of an acoustic signal are designed for a specific type of effect (e.g., noise, reverberation, language, type of channel, etc.). Thus, these solutions are helpful when it is know that the acoustic signal will contain only certain types of nuisance characteristics, and a different detector will typically be needed to detect each type of known nuisance characteristic.

SUMMARY OF THE INVENTION

One embodiment of a method for characterizing an acoustic signal includes extracting a vector from the acoustic signal, where the vector contains information about the nuisance characteristics present in the acoustic signal, and computing a set of likelihoods of the vector for a plurality of classes that model a plurality of nuisance characteristics.

One embodiment of a method for training a system to characterize an acoustic signal includes obtaining training data, the training data comprising a plurality of acoustic signals, where each of the plurality of acoustic signals is associated with one of a plurality of classes that indicates a presence of a specific type of nuisance characteristic, transforming each of the plurality of acoustic signals into a vector that summarizes information about the acoustic characteristics of the signal, to produce a plurality of vectors, and labeling each of the plurality of vectors with one of the plurality of classes.

BRIEF DESCRIPTION OF THE DRAWINGS

The teachings of the present invention can be readily understood by considering the following detailed description in conjunction with the accompanying drawings, in which.

To facilitate understanding, identical reference numerals have sometimes been used to designate elements common to multiple figures.

DETAILED DESCRIPTION

The present invention relates to a method and apparatus for audio characterization. In one embodiment, given a set of audio classes representing different nuisance characteristics in a set of training data, a Gaussian model is trained to represent vectors for each of the classes. These models are used to obtain the posterior probability of each class, given the vector for an input acoustic signal. This approach provides a unified way of detecting any kind of nuisance characteristic that is properly encoded in the vector used to represent the input acoustic signal.

Figure 1:
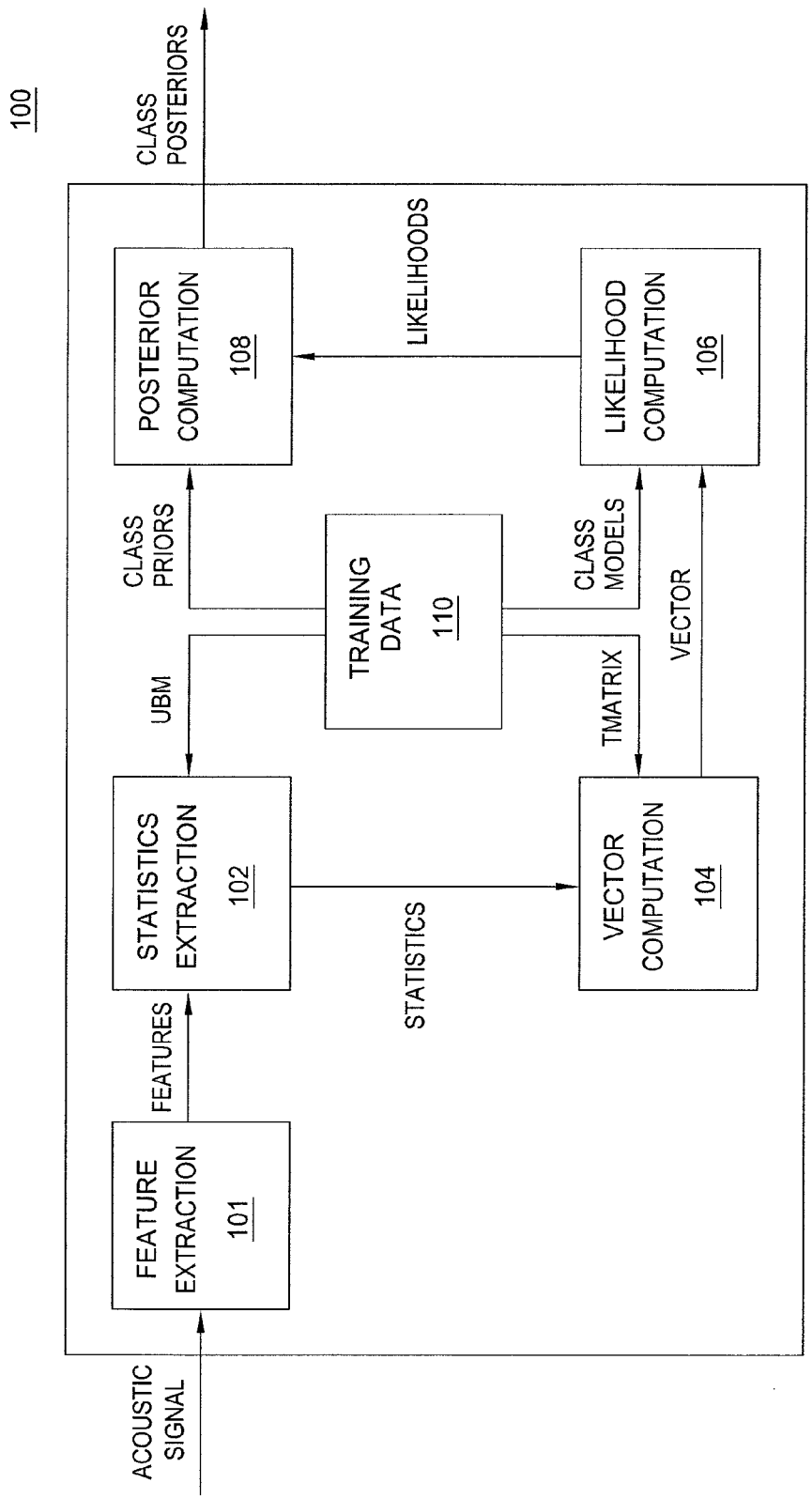
FIG. 1 is a schematic diagram illustrating one embodiment of an audio characterization system, according to embodiments of the present invention.

FIG. 1 is a schematic diagram illustrating one embodiment of an audio characterization system 100, according to embodiments of the present invention. As illustrated, the system 100 is trained to classify input acoustic signals according to characteristics detected in the signals.

The system 100 generally comprises a plurality of modules, including a feature extraction module 101, a statistics extraction module 102, a vector computation module 104, a likelihood computation module 106, and posterior computation module 108. Any one or more of these modules 102-108 may comprise a processor. In addition, the system 100 includes a corpus of training data 110 from which various tools can be generated and used to classify input audio signals. The system 100 may also include various input/output (I/O) devices (not shown) for receiving input acoustic signals and for outputting classification data. It is further noted that any one or more of the modules 101-108 may be split into further modules or alternatively combined with other modules. Moreover, the modules 101-108 may be distributed over multiple systems that communicate over a network.

The feature extraction module 101 receives an input audio signal and extracts features from the input audio signal. These features are extracted over the input acoustic signal and may include, for example, Mel frequency cepstral coefficients, energy, prosodic features, perceptual linear prediction features, among other features. In one embodiment, the features are extracted only over speech regions of the input acoustic signal (e.g., as detected by a voice activity detection algorithm); however, in further embodiments, features are also extracted over pauses in the input acoustic signal.

The statistics extraction module 102 receives the extracted features from the feature extraction module 101 and models first and second order statistics of the features. In one embodiment, the statistics extraction module 102 employs a universal background model (UBM) that is represented by a Gaussian mixture model (GMM) trained on the training data 110 to model the overall distribution of the extracted features (given a set of held-out data). The first- and second-order statistics are extracted with respect to the UBM.

The vector computation module 104 received the extracted statistics from the statistics extraction module 106 and uses the statistics to estimate a fixed-length vector corresponding to the input acoustic signal. In one embodiment, the vector is an iVector, for example as described by Dehak et al. in "Front-end Factor Analysis for Speaker Verification, IEEE Transactions on Audio, Speech, and Language Processing, vol. 19, no. 4, pp. 788-798 (May 2011), which is herein incorporated by reference. An iVector is a single, fixed-length vector of relatively low dimension that contains all relevant information (i.e., relevant to a stated purpose) in an acoustic signal. In the present case, the relevant information comprises all types of nuisance variability that the system 100 is trying to detect.

In one embodiment, the vector computation module 104 estimates an iVector using a total variability subspace model given by:

$$M = m + Tw \quad \text{(EQN. 1)}$$

where m is the UBM supervector (formed by concatenating the means from all Gaussians in the UBM), T is a low-rank rectangular matrix estimated using held-out data, w is a random vector having a standard normal distribution, and M is the supervector corresponding to an observed sample (acoustic signal). The vector w is a hidden variable whose posterior distribution is estimated to maximize the likelihoods of the features extracted by the feature extraction module 101, given the vector subspace model of FIG. 1 (i.e., the UBM with the new means given by the supervector M). The mean of the estimated posterior distribution of the vector w is the iVector for the acoustic signal.

The likelihood computation module 106 receives the vector from the vector computation module 104 and classifies the vector. In one embodiment, classification of the vector involves comparing the vector to one or more class models and computing a likelihood for each of the class models. The class models are trained on vectors that have been generated from the training data (which may coincide with the held-out data used to train the UBM and the T matrix) and labeled with particular nuisance characteristics (e.g., clean telephone signal, clean microphone signal, noisy signal with x-decibel signal-to-noise ratio, signal with reverberation of y reverberation time, etc.). The number and labels of the classes will depend on the type of training data that was available and the purpose for which the system 100 is designed.

The labeled vectors are used to train a class model for each nuisance characteristic. In one embodiment, each class is represented by a single Gaussian, where the mean is estimated as the mean of all vectors in the class. The covariance of all Gaussians is forced to be identical and is estimated by subtracting the mean of the corresponding class from each vector and then estimating the covariance of the resulting class-centered vectors.

The posterior computation module 108 receives the vector of likelihoods from the likelihood computation module 106 and converts the likelihoods into posterior probabilities. In one embodiment, the likelihoods are transformed into the posteriors using a Bayes rule and a set of class priors (which can be estimated from the training data, assumed as uniform, or arbitrarily defined based on prior belief of what the distribution of classes will be). The posterior probabilities are outputted as a vector of class posteriors.

The vector of class posteriors can be used directly as a representation of the characteristics of the audio found in the input acoustic signal. This way, if the input acoustic signal contains a combination of two or more characteristics that are only considered as separate classes for training, the class posteriors corresponding to those classes should be relatively large. For example, if the input acoustic signal contains noise at approximately eight decibels and reverberation at approximately 0.3 reverberation time, then the class posteriors corresponding to the class models for signal with noise of eight decibels and signal with reverberation of 0.3 reverberation time should both be relatively large.

Alternatively, if a decision about the input acoustic signal's class has to be made, the class model with the largest class posterior can be selected. Depending on how the output of the system 100 will be used (e.g., for speaker recognition, language identification, or another speech processing task), the likelihoods computed by the likelihood computation module 106 can be output without being converted to class posteriors.

Thus, the system 100 is capable of predicting the presence of a variety of types of nuisance characteristics (e.g., substantially any nuisance characteristic on which the system 100 was trained), without requiring separate expert detectors for each type.

Figure 2:
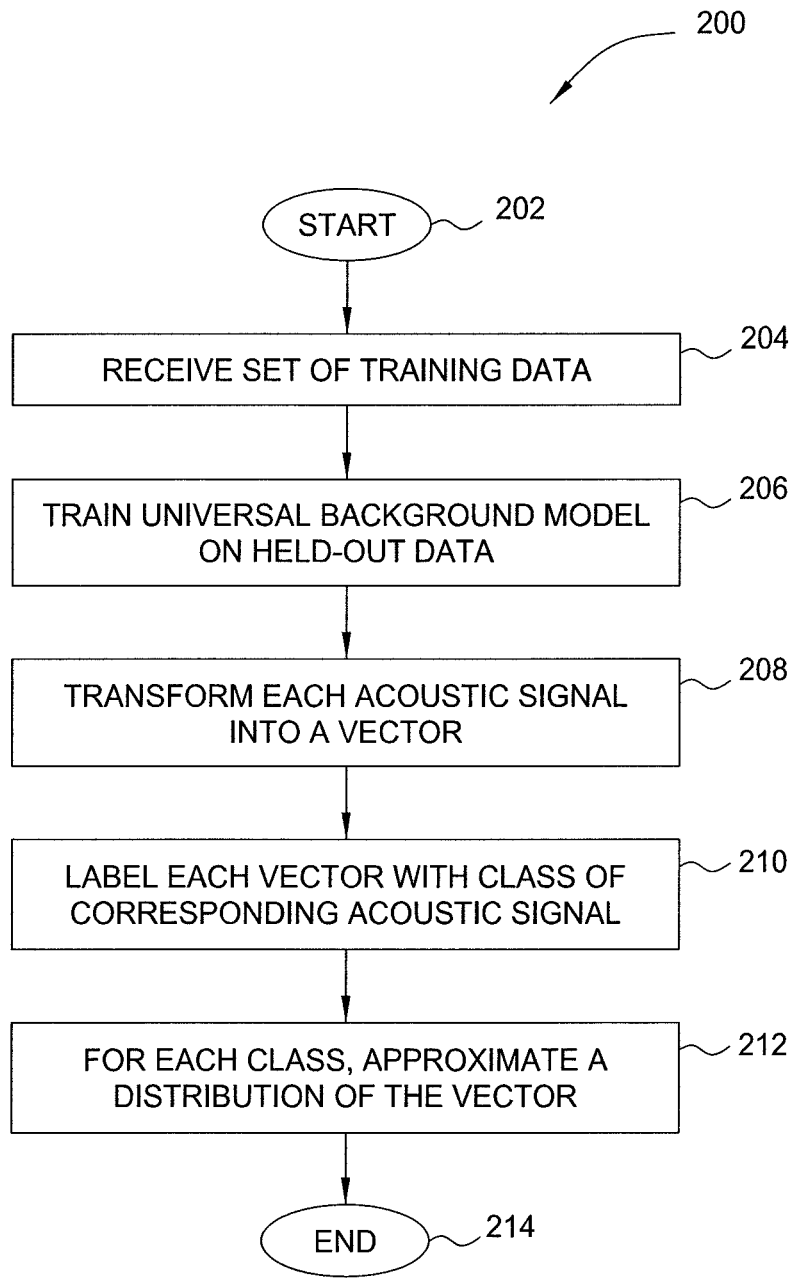
FIG. 2 is a flow diagram illustrating one embodiment of a method for training a system to characterize an acoustic signal, according to the present invention.

FIG. 2 is a flow diagram illustrating one embodiment of a method 200 for training a system to characterize an acoustic signal, according to the present invention. The method 200 may be executed by the audio characterization system 100 illustrated in FIG. 1. As such, reference is made in the discussion of the method 200 to various elements of FIG. 1. However, the method 200 is not limited by the hardware configuration illustrated in FIG. 1.

The method 200 begins in step 202. In step 204, the system 100 receives a set of training data. In one embodiment, the training data comprises a plurality of acoustic signals. Each of the acoustic signals is associated with a class that indicates a type of nuisance characteristic present in the signal.

In step 206, the statistics extraction module 102 trains the UBM on held-out data (which may coincide with the training data). As discussed above, the UBM is represented by a Gaussian mixture model (GMM) trained on the training data to model the overall distribution of features extracted from the acoustic signals (given the set of held-out data).

In step 208, the vector computation module 104 transforms each of the acoustic signals into a single vector that summarizes the information contained in the corresponding signal. In one embodiment, the means of the Gaussians in the UBM are then adapted to each acoustic signal. The concatenated vector of adapted means is then transformed into a smaller dimension (e.g., according to the total variability subspace model of EQN. 1). The resultant vectors are generally referred to as "iVectors" in the field of speaker recognition.

In step 210, labels are assigned to each of the vectors with the class (i.e., type of nuisance characteristic represented, such as "waveform recorded over telephone channel with signal-to-noise ratio of ten decibels") of its corresponding acoustic signal. In one embodiment, the labels are assigned by a human operator; however, in another embodiment, the labels are assigned by an automatic process. One Gaussian is trained to model each class; the Gaussians thus comprise a set of class models that are stored by the system 100. In one embodiment, the Gaussians share a common covariance matrix.

In step 212, the likelihood computation module 106 approximates a distribution of the corresponding vector for each class that was labeled in step 210. The method 200 ends in step 214.

Once trained, the system 100 can be used to compute the posterior probabilities of the class models (Gaussians), given a vector representing an input acoustic signal (assuming a certain prior distribution for the classes).

Figure 3:
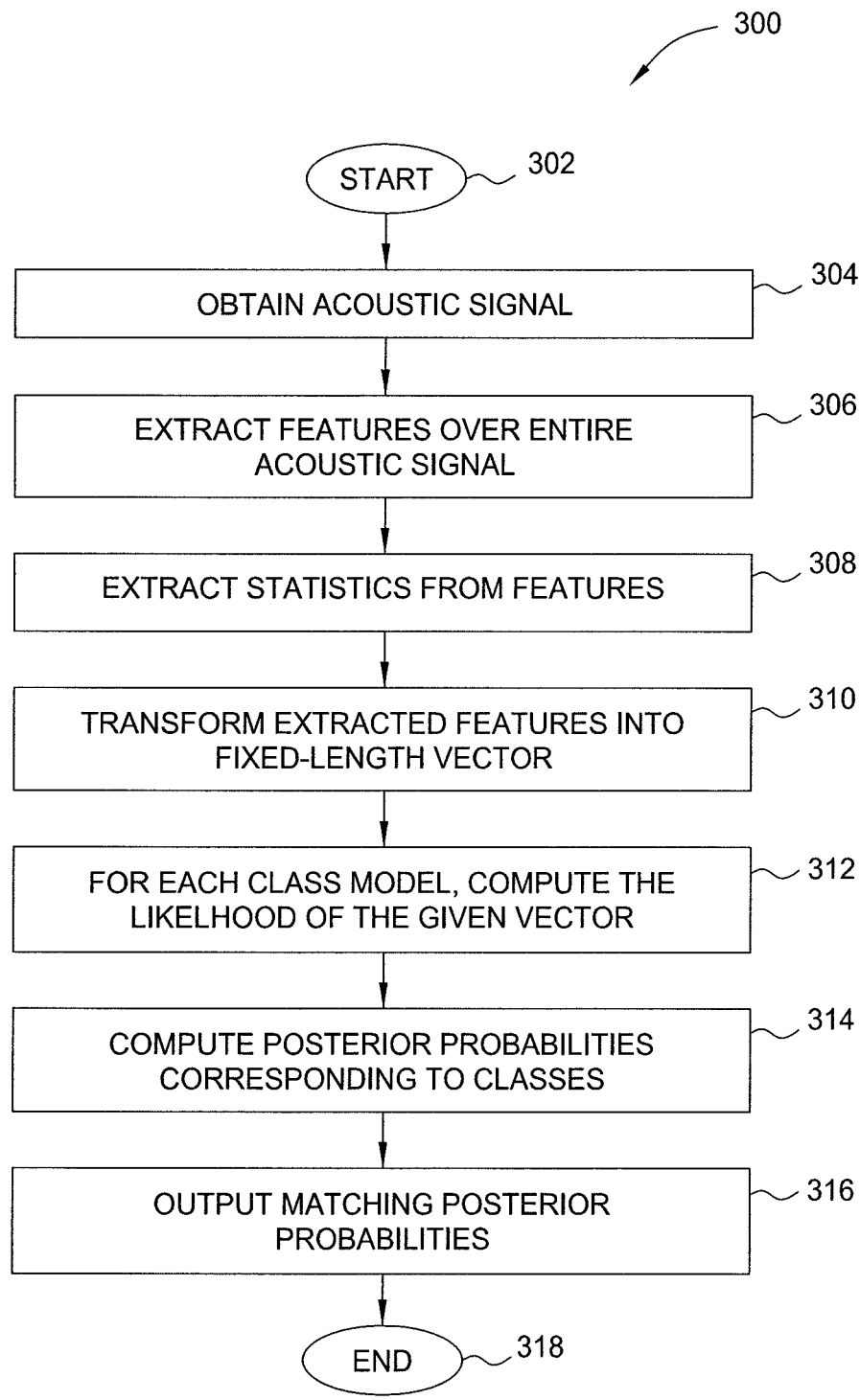
FIG. 3 is a flow diagram illustrating one embodiment of a method for characterizing an acoustic signal, according to the present invention.

FIG. 3 is a flow diagram illustrating one embodiment of a method 300 for characterizing an acoustic signal, according to the present invention. The method 300 may be executed by the audio characterization system 100 illustrated in FIG. 1. As such, reference is made in the discussion of the method 300 to various elements of FIG. 1. However, the method 300 is not limited by the hardware configuration illustrated in FIG. 1.

The method 300 begins in step 302. In step 304, the system 100 obtains an acoustic signal (e.g., via an input device such as a microphone, a telephone, a network interface card, or the like).

In step 306, the feature extraction module 101 extracts features (e.g., Mel frequency cepstral coefficients, energy, prosodic features, perceptual linear prediction features) over the entire acoustic signal. In one embodiment, the features are extracted only over speech regions of the input acoustic signal; however, in further embodiments, features are also extracted over pauses in the input acoustic signal.

In step 308, the statistics extraction module 102 extracts statistics from the features extracted in step 306. In one embodiment, these statistics comprise first- and second-order statistics that are extracted with respect to the UBM.

In step 310, the vector computation module 104 transforms the extracted features into a fixed length vector. As discussed above, in one embodiment, the fixed-length vector is an iVector.

In step 312, the likelihood computation module 106 computes the likelihoods of the fixed-length vector given the model for each class (i.e., each class in the labeled training data).

In step 314, the posterior computation module 108 computes the posterior probabilities given the likelihoods and the set of prior probabilities.

In step 316, the system outputs the posterior probabilities as a vector (e.g., via an output device such as a display, a speaker, a network interface card, or the like). In one embodiment, the vector of posteriors is used directly as a representation of the characteristics of the input acoustic signal. However, in another embodiment, the class associated with the largest posterior probability may be selected and output as the class corresponding to the input acoustic signal. The posterior probabilities may be outputted to a separate system that performs a specific speech processing task, such as speaker recognition or language detection.

The method 300 ends in step 318.

The method 300 allows for the joint estimation of the characteristics found in the input acoustic signal. If the input acoustic signal contains a combination of effects found only in multiple separate signals in the trainings data (and, hence, considered as separate classes during training), the posterior probabilities for the input acoustic signal will reflect this combination. For instance, comparable posterior probabilities may be obtained for the separate classes that represent the characteristics of the input acoustic signal. As an example, if the training data includes noisy data and reverberated data only in separate acoustic signals, training will produce two separate classes (i.e., one class for noisy signals and one class for reverberated signals). Given an input acoustic signal that contains both noise and reverberation, one would expect the vector of posterior probabilities to include comparable values for the two classes. Thus, the system 100 is flexible enough to process acoustic signals that have characteristics not directly observed during training.

In a further embodiment, multiple separate systems configured in a manner similar to the system 100 may be trained. For instance, a first system may be trained to predict noise, and a second, separate system may be trained to predict reverberation. This would allow one to separately predict the noise level and the reverberation level of an acoustic signal and to subsequently combine those predictions to obtain a final acoustic characteristic of the acoustic signal.

It is further noted that if, during computation of the initial likelihoods for an input acoustic signal, all of the computed likelihoods are relatively small (e.g., below a threshold), the system 100 may output a warning. The warning may indicate that the input acoustic signal does not match the training data well, and that the performance of a classification system of interest (e.g., speaker recognition, language detection, or the like) is likely to be unpredictable. For instance, if the ultimate goal is to detect speaker identity, and the input acoustic signal has a type or a level of noise that was not observed in the training data, it would be reasonable to expect that the score generated by the speaker identification system would be unreliable when based on the input acoustic signal.

As discussed above, the vector of posterior probabilities produced by the system 100 for an input acoustic signal may be provided as an input to a system that performs further speech processing tasks. As an example, the vector of posterior probabilities may be used to calibrate the scores produces by a speaker recognition system with a function that depends on the posterior probabilities. Speaker recognition determines whether a speaker present in an input signal is the same speaker present in a specific enrollment signal, and may produce a score that indicates how likely it is that the speaker is the same in both signals. Calibration of the scores produced by the speaker recognition system is usually the final stage of the speaker recognition process; however, the speaker recognition system may be adapted to the detected audio characteristics in the input signal at any one of several steps in the speaker recognition process.

Speaker recognition samples, generally referred to as "trials," comprise both the input signal and the enrollment signal. The calibrated log-likelihood-ratio output for a trial among signals I and j may be expressed as:

$$I_{ij} = \alpha + \beta s(i,j) + q(i)'Wq(j) \quad \text{(EQN. 2)}$$

where s(i,j) is the score generated by the speaker recognition system for the trial, and q(i) and q(j) are vectors of metadata (high-level information) for the two signals in the trial (where the vectors are augmented by appending a 1). $\alpha$, $\beta$, and W are fusion parameters, where $\alpha$ is an offset, $\beta$ is a weight, and W is a bilinear combination matrix (constrained to be symmetric). In the functional form expressed in EQN. 2, the metadata affects the final score only through a bias; the metadata does not affect the weight given to the scores. This is a good first approach for testing the effect of the audio characterization posterior probabilities when used as metadata for calibration.

In one embodiment, the fusion parameters are trained through maximization of a cross-entropy objective function.

The system 100 described above is only one specific implementation of a more general embodiment of the present invention. More generally, the present invention models vectors that represent acoustic signals (or segments of acoustic signals) using a certain trainable distribution. The trainable distribution in turn is used to obtain posterior probabilities for new acoustic signals. The representative vectors may be obtained in a variety of ways and are not necessarily restricted to the iVector framework discussed above. The class models into which the training data is divided can be given by labels or can be inferred from the vectors corresponding to the training data (e.g., using clustering techniques). The distribution that models the classes can be any type of distribution (including non-Gaussian distributions).

Figure 4:
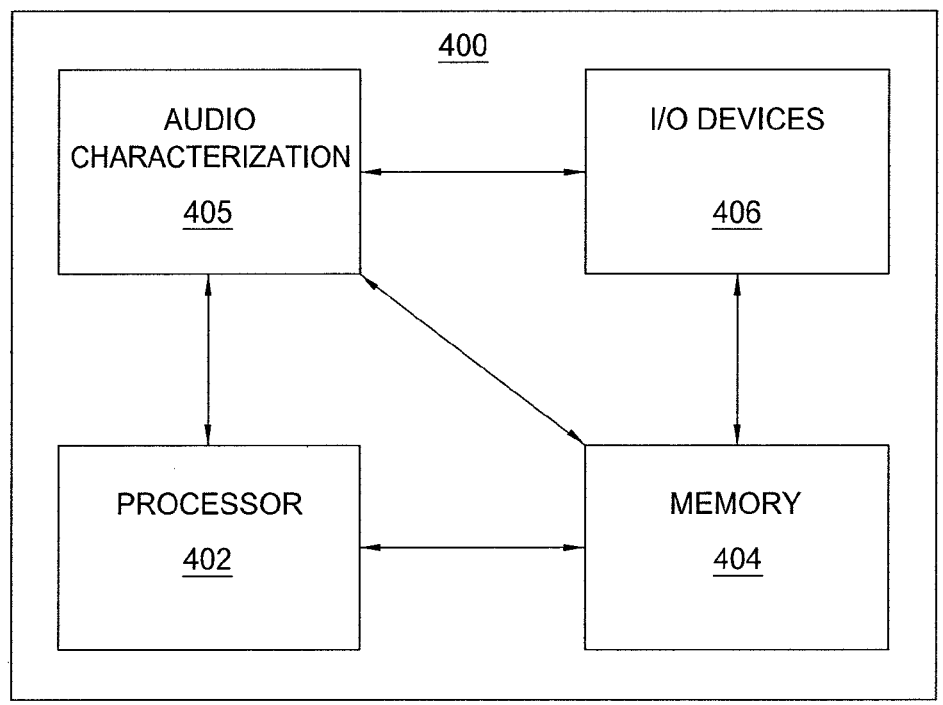
FIG. 4 is a high level block diagram of the present audio characterization system that is implemented using a general purpose computing device.

FIG. 4 is a high level block diagram of the present audio characterization system that is implemented using a general purpose computing device 400. The general purpose computing device 400 may, for example, generally comprise elements of the audio characterization system 100 discussed above. In one embodiment, a general purpose computing device 400 comprises a processor 402, a memory 404, an audio characterization module 405 and various input/output (I/O) devices 406 such as a display, a keyboard, a mouse, a modem, a microphone, a transducer, and the like. In one embodiment, at least one I/O device is a storage device (e.g., a disk drive, an optical disk drive, a floppy disk drive). It should be understood that the audio characterization module 405 can be implemented as a physical device or subsystem that is coupled to a processor through a communication channel.

Alternatively, the audio characterization module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the audio characterization module 405 for identifying nuisance characteristics in acoustic signals described herein with reference to the preceding Figures can be stored on a non-transitory or tangible computer readable medium or carrier (e.g., RAM, magnetic or optical drive or diskette, and the like).

One or more steps of the methods described herein may include a storing, displaying and/or outputting step as required for a particular application, even if not explicitly specified herein. In other words, any data, records, fields, and/or intermediate results discussed in the methods can be stored, displayed, and/or output to another device as required for a particular application.

Although various embodiments which incorporate the teachings of the present invention have been shown and described in detail herein, those skilled in the art can readily devise many other varied embodiments that still incorporate these teachings.

What is claimed is:

1. A computer-implemented method for characterizing an input acoustic signal, the method comprising, with a computing system:

accessing a set of models representative of training data, wherein the training data comprises training acoustic signals, each training acoustic signal-being representative of one of a plurality of different types of nuisance characteristics, the plurality of different types of nuisance characteristics comprising at least two of: a channel effect, a background noise, a reverberation, a signal-to-noise ratio, a language variation, a speaker mood, and a recording condition;

extracting a plurality of features from the input acoustic signal;

based at least partly on the extracted features and the set of models, generating a mathematical representation of the input acoustic signal that indicates a likelihood of a presence of each of the different types of nuisance characteristics in the input acoustic signal;

based at least partly on the mathematical representation of the input acoustic signal, outputting nuisance identification data to a speech processing system;

performing, by the speech processing system, at least one of: speech or speaker recognition, language identification, and/or emotion detection, using the nuisance identification data, wherein the nuisance identification data identifies at least two different types of nuisance characteristics present in the input acoustic signal;

predicting and applying at least one parameter of the speech processing system based at least in part on the nuisance identification data identifying the at least two different types of nuisance characteristics present in the input acoustic signal used to improve performance of the speech processing system in processing the input acoustic signal including the detected nuisance characteristics; and wherein at least one result of the performing at least one of speech or speaker recognition, language identification, and/or emotion detection is output by the speech processing system and displayed to a user of the computing system.

2. The method of claim 1, further comprising:

computing a set of likelihoods of a vector that summarizes information about the extracted features for a plurality of classes that model a plurality of nuisance characteristics; and outputting the set of likelihoods to the speech processing system.

3. The method of claim 2, wherein the method further comprises converting the likelihoods to posterior probabilities.

4. The method of claim 3, further comprising outputting the posterior probabilities to a speech processing system.

5. The method of claim 3, wherein the converting employs a Bayes rule and a set of class priors.

6. The method of claim 2, wherein the vector is an iVector.

7. The method of claim 2, wherein the extracting comprises:

extracting a plurality of features from the input acoustic signal; and estimating the vector from the plurality of features.

8. The method of claim 7, wherein the plurality of features is extracted over an entirety of the input acoustic signal.

9. The method of claim 8, wherein the plurality of features comprises a Mel frequency cepstral coefficient.

10. The method of claim 8, wherein the plurality of features comprises energy.

11. The method of claim 8, wherein the plurality of features comprises a perceptual linear prediction feature.

12. The method of claim 8, wherein the plurality of features comprises a prosodic feature.

13. The method of claim 7, wherein the vector is extracted using a Gaussian mixture model that models an overall distribution for the plurality of features in a set of training data.

14. The method of claim 7, wherein the plurality of features includes only features extracted over regions of speech in the input acoustic signal.

15. The method of claim 7, wherein the plurality of features includes features extracted over pauses in the input acoustic signal.

16. The method of claim 2, wherein each of the plurality of classes is represented by a single Gaussian having a mean estimated as a mean of vectors in a corresponding one of the plurality of classes.

17. The method of claim 16, wherein a covariance of a plurality of Gaussians representing the plurality of classes is forced to be identical.

18. The method of claim 2, further comprising generating a warning in response to all of the likelihoods in the set of likelihoods being below a threshold.

19. A non-transitory computer readable storage medium comprising a plurality of instructions to cause a computing system to characterize an input acoustic signal, wherein the instructions perform the steps of:

extracting a vector from the input acoustic signal, wherein the vector comprises information about nuisance characteristics present in the input acoustic signal; and computing a set of likelihoods of the vector for a plurality of classes that model a plurality of nuisance characteristics;

based at least partly on the computed likelihoods, identifying a combination of nuisance characteristics present in the input acoustic signal;

outputting nuisance identification data that includes the identified combination of nuisance characteristics to a speech processing system that performs at least one of speech or speaker recognition, language identification, and emotion detection; and predicting at least one parameter of the speech processing system based at least in part on the nuisance identification data identifying the at least two different types of nuisance characteristics present in the input acoustic signal to improve performance of the speech processing system in processing the input acoustic signal including the detected nuisance characteristics; and wherein at least one result of the performing at least one of speech or speaker recognition, language identification, and/or emotion detection is output by the speech processing system and displayed to a user of the computing system.

20. The method of claim 1, further comprising the speech processing system performing speech processing based at least in part on the at least one predicted parameter.

21. The non-transitory computer readable storage medium of claim 19, further comprising the speech processing system performing speech processing based at least in part on the at least one predicted parameter.

* * * * *